March 7, 1972 SI I. SPIEGEL 3,647,605
ARTIFICIAL PLANT UTILIZING A THREE-DIMENSIONAL SHELL FRAMEWORK
Filed Jan. 14, 1970 3 Sheets-Sheet 1
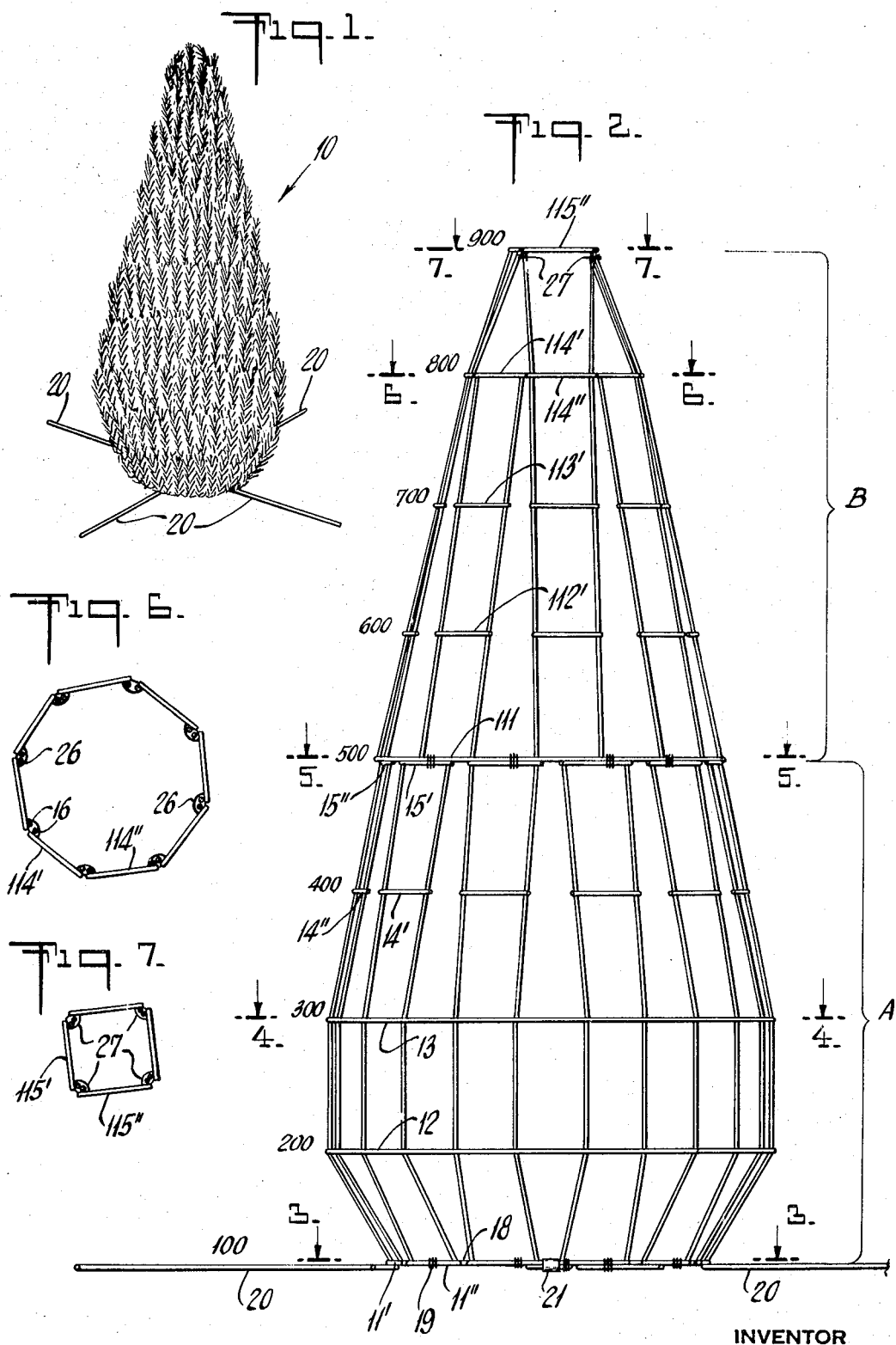

March 7, 1972  SI I. SPIEGEL  3,647,605
ARTIFICIAL PLANT UTILIZING A THREE-DIMENSIONAL SHELL FRAMEWORK
Filed Jan. 14, 1970  3 Sheets-Sheet 2
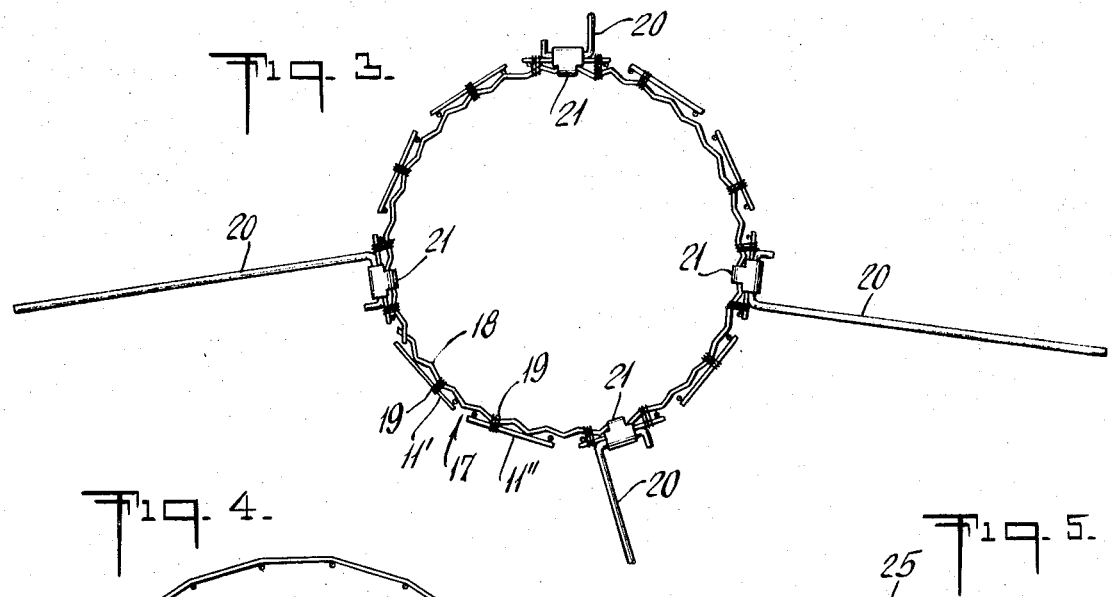
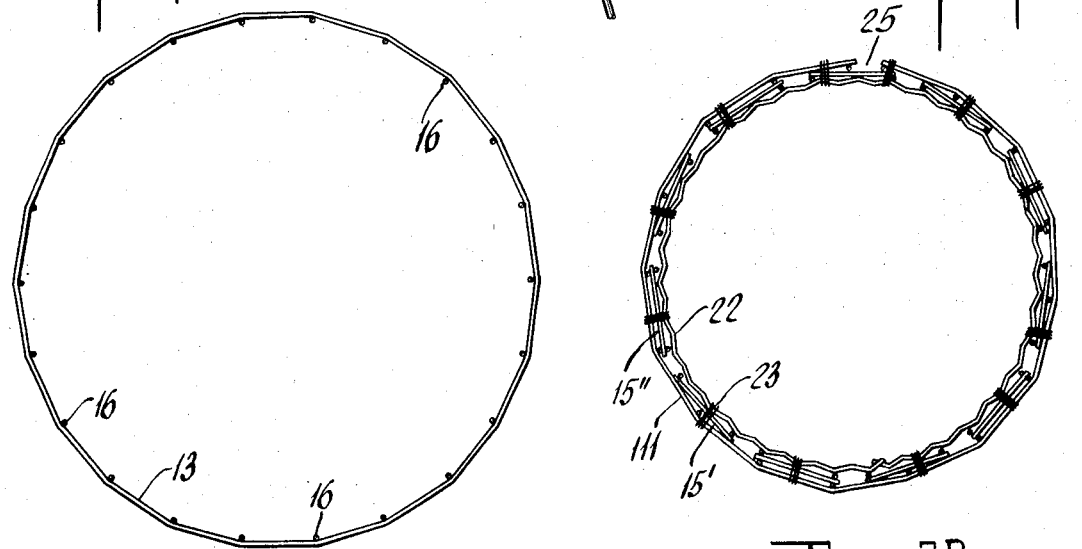
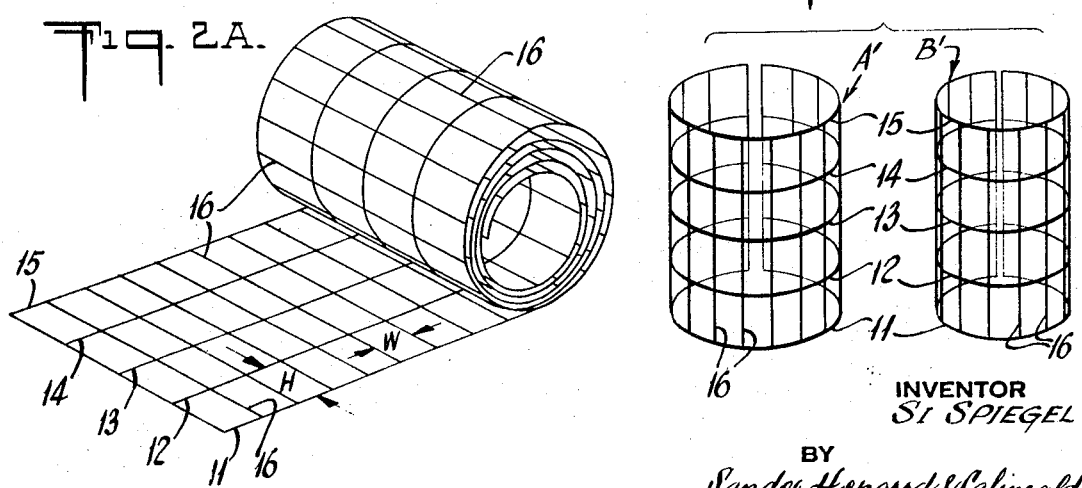
INVENTOR
SI SPIEGEL
BY
Sandoe, Hopgood & Calimafde
ATTORNEYS

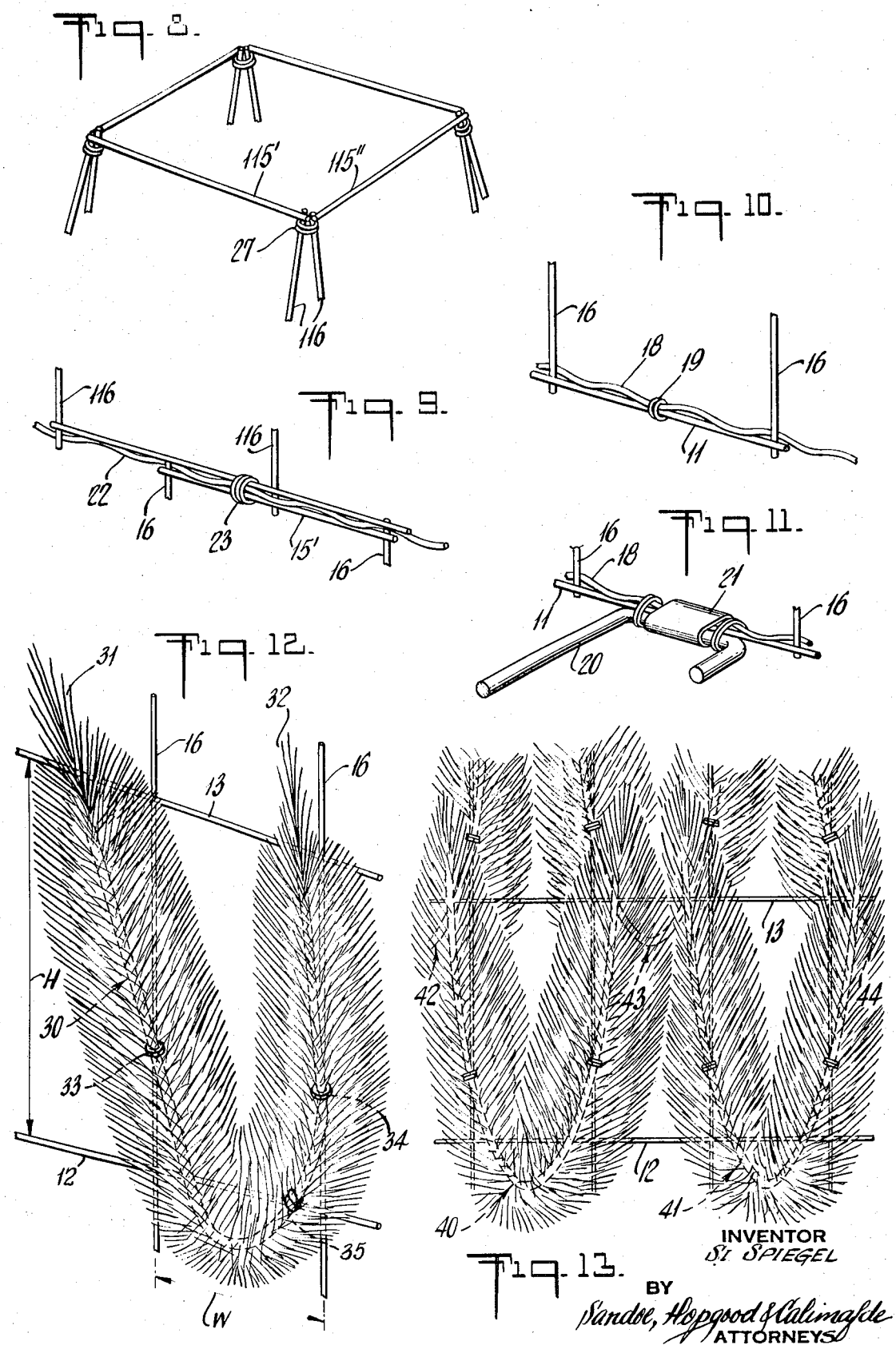

United States Patent Office 3,647,605
Patented Mar. 7, 1972

3,647,605
ARTIFICIAL PLANT UTILIZING A THREE-DIMENSIONAL SHELL FRAMEWORK
Si I. Spiegel, Briarcliff, N.Y., assignor to American Technical Industries, Inc., New York, N.Y.
Filed Jan. 14, 1970, Ser. No. 2,853
Int. Cl. A47g 33/04
U.S. Cl. 161—31
17 Claims

ABSTRACT OF THE DISCLOSURE

An artificial tree or bush utilizing a three-dimensional shell or basket-like framework having the general shape of the tree or bush. The framework is comprised of upstanding rods or wire stringers attached to a series of horizontal members, the upstanding rods and horizontal members thus providing a gridwork of wires to which artificial branches can be attached. The foliage of the bush or tree is comprised of a plurality of needle, flower or leaf-bearing branches bent into a general U shape and attached to the gridwork so that each such branch provides two outwardly and upwardly extending extremities. The branches are overlapped upon the framework so that the U-shaped base portions of the branches and the framework are hidden by the outwardly extending branch ends of lower branches.

---

The method of manufacturing an artificial plant which comprises selecting a length of open-mesh welded steel fencing, connecting the ends of said length to form an overall cylindrical shape on an elongated axis, permanently deforming one longitudinal end of said cylindrical shape to a reduced perimeter substantially shrunken from that of another longitudinal part of said cylindrical shape, thereby defining an upstanding open-mesh frame, selecting a plurality of like branch elements of bristiles radiating from a central deformable retaining core, and individually securing said branch elements to said frame at mesh openings thereof with at least one longitudinal end of each branch element extending outwardly and upwardly with respect to said frame.

This invention is in the field of artificial trees and shrubbery and pertains to a novel supporting structure for the branches of a plant and to the method of assembly.

BACKGROUND OF THE INVENTION

Simulated bushes or trees, particularly artificial Christmas trees, have been marketed commercially for some time and have usually taken the form of a stem-like central trunk with branches of artificial foliage connected to the trunk and extending outwardly in varying lengths from bottom to top. For the case of the simulated Scotch Pine Christmas tree, the longer branches would be placed at the bottom of the tree, and the branches would get successively shorter in length as the top was approached. Obviously, the assembly of the tree involved cutting branches into different lengths and sorting the branches for placing them on the trunk of the tree in proper order. The assembly process contributed significantly to the expense of producing an artificial tree.

OBJECTS OF THE INVENTION

It is an objective of the invention to provide a structure for an artificial tree or shrub which eliminates the need for a conventional trunk and branch-supporting structure.

Another object of the invention is to provide an artificial tree or shrub which is light in weight and economical to manufacture.

An important object of the invention is to provide a simulated bush or tree much cheaper to assemble than any prior known artificial bush or tree.

A more specific object of this invention is to provide a simulated bush or tree in which branch elements of substantially the same length are employed from bottom to top.

It is also an object of this invention to provide a hollow-shell-like supporting structure for an artificial shrub which is readily adaptable for the construction of shrubs of various sizes or shapes.

It is a general object to achieve the foregoing objects with a construction which produces a bush of highly pleasing overall appearance and seeming fullness which is unusually rugged and resistive to abuse, which is also readily repairable if necessary, which lends itself to easy and rugged planting in the ground or above ground (as in a planter), and which is rot-free.

SUMMARY OF THE INVENTION

Basically, the invention comprises an artificial tree or bush utilizing a three-dimensional shell or basket-like framework having the general shape of the tree or bush. The framework is comprised of upstanding rods or wire stringers attached to a series of horizontal members, the upstanding rods and horizontal members thus providing a gridwork of wires to which artificial branches can be attached. The foliage of the bush or tree is comprised of a plurality of needle, flower or leaf-bearing branches bent into a general U shape and attached to the gridwork so that each such branch provides two outwardly and upwardly extending extremities. The branches are overlapped upon the framework so that the U-shaped base portions of the branches and the framework are hidden by the outwardly extending branch ends of lower branches.

The invention has particular application in the construction of shrubbery designed to have dense foliage, such as that of a well-cultivated conifer or evergreen shrub. As one does not ordinarily see the interior structure of such a shrub in its natural form because of the density of the outer foliage, the invention seeks to eliminate this unseen interior structure, and thus to economize over the conventional methods of artificial duplication of natural shrubbery. By eliminating the conventional trunk and branch structure of the bush, the branches used for the foliage need not extend from the surface of the bush into the trunk. The elimination of such inner portions of the branches is doubly valuable, in that the overall weight of the bush is reduced, and a great saving is realized in the amount of the branch material required. Further, assembly of the tree is simplified in that the branches may all be of the same length. And, since the branches are not long cantilevers, they are much less subject to abuse.

Other objectives, advantages and various further features of novelty and invention will be pointed out or will occur to those skilled in the art from a reading of the following specifications in conjunction with the accompanying drawings. In said drawings, which show, for illustrative purposes only, a preferred form of the invention:

FIG. 1 is a perspective view of a completely assembled Christmas tree according to the invention;

FIG. 2 is an enlarged view in elevation of the hollow shell-like frame of the tree shown in FIG. 1;

FIGS. 2A and 2B are simplified perspective views to illustrate successive steps in forming the frame of FIG. 2;

FIG. 3 is a sectional view to show the bottom horizontal member of the frame, taken along line 3—3 in FIG. 2;

FIG. 4 is a sectional view to show another horizontal member, taken along line 4—4 in FIG. 2;

FIG. 5 is a sectional view to show adjacent horizontal members, taken along line 5—5 in FIG. 2;

FIG. 6 is a sectional view to show a horizontal member, taken along line 6—6 in FIG. 2;

FIG. 7 is a plan view of the top horizontal member of the tree frame, as viewed from line 7—7 in FIG. 2;

FIG. 8 is an enlarged fragmentary perspectivie view of framework at the top of the tree;

FIG. 9 is an enlarged fragmentary perspective view showing connection of the adjacent horizontal members of FIG. 5;

FIGS. 10 and 11 are similar enlarged fragmentary perspective views showing different peripherally spaced parts of the bottom of the tree frame, at the horizontal member of FIG. 3;

FIG. 12 is an enlarged fragmentary perspective view to illustrate local attachment of a foliage-branch element to the grid work of the tree frame; and FIG. 13 is an enlarged view in front elevation to show attachment of several foliage branch elements to the frame.

DESCRIPTION OF THE INVENTION

Although this invention may be used in the context of many different shapes and sizes of simulated bushes and trees and may be used in the context of many different kinds of artificial foliage, simulating various types of natural trees and bushes, the invention here will be described in the context of a Christmas tree with the shape and size approximating a Scotch Pine. Such a tree is illustrated in FIG. 1 with foliage 10 that is characterized by a bulbous lower contour, which conically tapers to a pointed top. Root or anchoring structure 20 radiates from the base.

According to the invention, and referring in general to FIG. 2, the framework for supporting the foliage 10 is an open-mesh basket-like assembly which conveniently is made from standard galvanized welded steel wire fencing. Preferably, the fencing is coated dark green, as with vinyl or enamel, to resist weathering and to mask any direct view of the frame. In the form shown, two such structures are united at the central elevation depicted in FIG. 5 for the plane 5—5. For convenience, the lower of these structures is generally designated A, and the upper one is designated B.

Each of the structures A–B is produced by the same general technique, to develop the desired bulbous or tapering contour. And structures A–B are connected at matching sections, with matching taper, to avoid discontinuity in the overall appearance of the tree contour.

For the technique shown in detail, steel wire fencing of large rectangular open mesh is selected and cut to a first length which represents the maximum peripheral extent of the lower structure A, and a second length of the same material is cut to match the maximum peripheral extent of the upper structure B. The wire mesh of the fencing illustrated (see FIG. 2A) is defined by five longitudinal strands 11–12–13–14–15, laterally spaced and interconnected as by welding, to plural transverse wires 16. Having cut the lengths needed for the sections A–B, the cut longitudinal ends of each section may be joined, as by wire wrapping ties at overlapped end wires 16, to create two generally cylindrical loops, designated A'–B' in FIG. 2B. Since the same fencing roll (FIG. 2A) supplies material for both cylindrical loops A'–B', these structures will have the same axial extent, shown to comprise four like spans H; each of structures A'–B' is thus responsible for defining five tiers or levels in the ultimate assembly of FIG. 2, and circumferential extent is divided into units W of spacing between wires 16. Since the lower tier of the upper structure B' is connected to the upper tier of the lower structure A', the ultimate frame assembly (FIG. 2) has nine tiers, successively identified 100, 200, 300 . . . 900, respectively. For the form shown, the lower structure A' has a circumferential extent of twenty-two angular spaces or units W, and the upper structure B' has a circumferential extent of sixteen units W. To avoid confusion, the respective longitudinal strands of the upper structure B'(B) are identified 111–112–113–114–115.

To create a bulbous appearance in the lower structure A', upper and lower tier strands are effectively shortened with respect to those at the levels of maximum bulbous girth. Thus, at levels 200–300, the tier strands 12–13 are left untouched to define a cylindrical length of maximum girth. The lower strand 11 is effectively shortened or shrunk to create an inward convergence or taper to and through the levels 400–500. At the level 500, the effective circumferential extent of the lower structure A matches the circumferential extent of the base strand 11 of the upper structure B'(B) and continued tapering in the upper structure B is achieved by progressive shrinkage of the effective circumferential extent of the strands at upper tier levels 600–700 . . . 900.

Circumferential shrinkage may be achieved by like local crimping of a given longitudinal wire strand, at adjacent spaces W therealong, or at regularly spaced intervals of spaces W. Alternatively, and as shown, the strand wire is cut at the local region to be shrunk. Thus, for the case of the lowest or base tier 100, the base strand 11 of structure A is severed at every other space W, to create discrete segments 11'–11", etc., tying pairs of adjacent converging spacer wires 16. Adjacent segments 11'–11", etc., are brought together at gaps 17, to an extent reflecting the desired lower converging taper, and a reinforcing band or hoop 18 (of desired circumferential extent for tier 100) may establish circumferential reference for the inwardly bent strand segments 11'–11", etc. Preferably, the hoop 18 is corrugated, so that the wire ties, as at 19, between segments 11'–11", etc. may be firmly angularly and radially referenced to the hoop 18. Additionally, since the bottom tier is also the base of the tree, root structure, such as radial rods 20, is anchored to the hoop 18. Each rod 20 is generally J shaped with a straight base which is strapped at 21 and locally tangent to hoop 18, so that rods 20 may be radially inwardly folded (on hinge axes tangent to hoop 18) for packaging and shipment, and outwardly opened for use as dictated by local "planting" requirements.

Similar shrinking techniques, such as cutting at desired intervals W, are applied at tiers 400 and 500, to produce adjacent strand segments 14'–14", etc., and 15'–15", etc., at these levels. And in FIG. 5, another corrugated reinforcing hoop 22, of desired circumferential extent, provides firm angular and radial reference for the inwardly bent segments (15'–15") cut from the upper strand 15 of the lower frame structure A. Means such as wire wraps 23 tie segments 15'–15", etc., to tangent corrugations of the hoop 22 and to the base strand 111 of the upper structure B. In the form shown, the circumferential extent at the central tier 500 does not exactly match the cut length of fencing for the upper structure B. This fact is by no means fatal and in fact may simplify assembly, in that the upper cut length need only be wrapped around and tied as described at 23, leaving a gap 25 between unconnected ends; adequate circumferential integrity is of course provided by the hoop 22 at tier 500.

Since the taper between tiers 300–500 is matched by that between tiers 500–800, the same shrinking technique may be employed at strands 112–113–114. And at the upper limit of this taper, the tier 800 has the appearance displayed in FIG. 6. If desired, a reinforcing hoop, of the nature described at 18–22, may be provided at one or more of the levels 600–700–800, but I find this unnecessary if the wire guage is properly selected for the overall size of the finished article.

Finally, between tiers 800–900, the frame tapers more steeply, to blunt or crown the upper end of the tree. And what had been eight strand segments 114'–114", etc., connected as by wire wraps 26, become four segments 115'–115", etc., at the top tier 900. This results from having cut out odd pairs of stringers 116, above the level 800. Wire wraps 27 secure the corners of the resulting square at level 900 (see FIG. 8). These connections also complete the frame assembly.

According to a feature of the invention the foliage carried by the described frame comprises plural like short lengths or artificial foliage material, such as the "Scotch Pine" bristled length or branch element 30 of FIG. 12. Such material comprises a twisted-wire core which retains the bristle or "needle" strands, and the "Scotch Pine" effect is produced by axially outwardly deflecting the needles at opposite axial ends 31–32 of the cut length 30. Preferably, the cut length 30 is bent in half, into generally U shape. The bent center is applied to span the space W between adjacent stringers 16, and near the central bend the two arms overlie or substantially register with adjacent stringers 16 and may be secured thereto, as by wire wraps 33–34; preferably, the wire wraps 33–34 are applied near the next lower strand wire, so that the bend of the U shape stabilizes the secured branch element, particularly when the free outer ends thereof are bent outwardly, so as to project with natural appearance and in somewhat random fashion but nevertheless generally upwardly and outwardly from the region of one of the openings in the mesh of the frame.

In FIG. 13, I illustrate that plural branch elements 40–41 may be assembled as described at odd intervals of spaces between stringers for a first elevation range, as between levels 200–300, and that similar assembly (of plural elements 42–43–44) for even intervals at the levels above and below the range 200–300 will create an interlaced more random "filling" of the foliage. In practice, it is also desirable to introduce small and different bends and twists in the projecting branch ends, for a still more random and lifelike bushy appearance. Ordinarily, the wire wraps 33–34 will suffice for the described upward and outward projection of the branch ends 31–32, as long as these wraps are tight and involve sufficient side-by-side adjacency of the bristle core with the stringer 16 along which it is locally secured; if desired, a further wire-wrapping tie may be made at local cross-over of the horizontal strand (12), as suggested at 35.

In practice, it is convenient to assemble brush elements to the frame, beginning at the uppermost level, and then working downwardly with the described pattern of interlace, each successively lower tier. When all branch elements have been fastened, the free projecting ends of the branch elements may be bent to the upward and outward orientation already described; this is most conveniently done by bending the branches first at the lowest level, and then progressing upwardly to the top of the tree.

It will be seen that the described embodiment of the invention achieves all the stated objects, with economy, ruggedness and lifelike appearance. Morever, the basic concept of this invention, that is, preparing the frame of an artificial tree in a hollow shell-like structure with gridwork members providing multitudinous locations for attaching branches can be applied to many different shapes of trees and bushes and to many different types of foliage. For example, an artificial hedge, square or rectangular in cross section, can be easily constructed using the concepts of this invention. The particular configuration described herein, that of a Scotch Pine Christmas tree, is given for illustrative purposes only, and in that situation the bristled center or bend of the branch elements serves not only a structural function but also to provide bristle bulk or body, behind the outwardly and upwardly projecting ends 31–32, for richness of foliage; moreover, the described technique of fastening branch arms to adjacent stringers 16, near the next lower wire strand, not only stabilizes the outwardly bent branch ends but also prevents the branch element from sliding down below a limiting stop, namely, said next lower wire strand.

It should be recognized that modifications may be made without departing from the scope of the invention. For example, other techniques may be employed to develop the framework to which the foliage elements are secured. Also, other simulated bushes of familiar shape can be made by securing foliage elements of the invention to other simple three-dimensional geometrical shapes, as for example: (1) an upright yew, based on a similar frame that is an upright, predominently elongated, cylinder, with convergent conical sections at top and bottom ends; (2) a taxus yew, based on a similar frame that is a relatively shorter and more stubby upright cylinder; (3) a topiary, based on vertically spaced, like globular frames of wire framework, carried by a central upright stem; (4) a rising spreader, based on an inverted upstanding conical basket-like frame; (5) a hedge, based on a rectangular prismatic framework; and (6) a muhgo pine, based on a short, stubby, truncated inverted cone of basket-like framework. Still further, the U-shapes of the foliage elements may be combined with each other or with single-arm foliage elements, to produce particular decorative effects, without departing from prime reliance upon the described U-shapes and their method of attachment to the frame.

What is claimed is:

1. An artificial-plant structure, comprising a gridwork frame of two intersecting sets of spaced elongated members connected at their points of intersection, and foliage-bearing means comprising plural U-shaped branch elements centrally folded to define separate branch arms with each of the two extremities thereof comprising a branch end, each arm of each branch element being secured in local overlap with part of a different frame member, such securing being short of the branch ends, so that the branch ends may diverge outwardly from said frame.

2. The artificial plant of claim 1, wherein said U shaped foliage branch elements are substantially uniform in length.

3. The simulated plant of claim 1, wherein each said fastening means comprises a wrap of wire.

4. A simulated plant, comprising a three-dimensional gridwork frame of horizontal and vertical elongated members, said horizontal members lying in substantially parallel horizontal planes at spaced intervals one above the other, said vertical members being connected to said horizontal members at said spaced intervals, and a plurality of wire-reinforced artificial foliage-bearing branch elements arranged upon and fastened to said frame members, a first length portion of each branch element being fastened to an adjacent frame member with a free bendable upwardly extending end-length portion projecting free of connection to said frame.

5. The simulated plant of claim 4, in which said frame includes first and second tapering component frames, interconnected one above the other.

6. The simulated plant of claim 5, wherein the taper of said frame is continuous at the interconnection of said component frames.

7. An artificial plant, comprising a three-dimensional gridwork frame of horizontal and vertical elongated members, said horizontal members lying in substantially parallel horizontal planes at spaced intervals one above the other, said vertical members being connected to said horizontal members at said spaced intervals, and artificial foliage-bearing means arranged upon and fastened to said frame members, said foliage-bearing means comprising substantially U-shaped branches attached to said frame in interlaced relation at adjacent planes, both extremities of the U-shaped branches extending upwardly and outwardly of said frame.

8. The simulated plant of claim 4, wherein said frame is of external shape that is substantially a surface of revolution about an upstanding axis, and said frame comprises a plurality of angularly spaced upstanding rods bent to conform with and to determine said general shape, and a plurality of spacer rods interconnecting adjacent upstanding rods to retain said shape.

9. The simulated plant of claim 8, wherein said spacer rods include circumferentially continuous hoops at vertically spaced locations.

10. An artificial plant, comprising a three-dimensional gridwork frame of horizontal and vertical elongated members, said horizontal members lying in substantially parallel horizontal planes at spaced intervals one above the other, said vertical members being connected to said horizontal members at said spaced intervals, artificial foliage-bearing means arranged upon and fastened to said frame members, the base plane of said frame being generally circular, and a plurality of elongated anchoring members hingedly connected to said frame at said generally circular base plane, said anchoring members being at angularly spaced locations and on hinge axes substantially tangent to the circle of said base, whereby said anchoring members may be folded into overlapping relation or extended as required for different mounting conditions.

11. An artificial plant, comprising an integrated upstanding frame of interconnected wires defining a three-dimensional outer-surface contour having the general shape of a natural plant, said interconnected wires defining a pattern of open spaces, said open spaces being framed by wires and having individual areas which substantially exceed the effective areas of the wires which frame the openings, and a plurality of wire-reinforced foliage bearing branch elements secured to the outer-surface contour of said frame in such number and density that the foliage of said branch elements substantially masks said frame, a first length portion of each branch element being fastened to an adjacent frame member with a free bendable upwardly extending end-length portion projecting free of connection to said frame.

12. The plant of claim 11, in which each said branch element comprises plural foliage bristles bound by and radiating from an elongated wire core, said branch elements being secured to said frame with at least one longitudinal end extending upwardly and outwardly.

13. The plant of claim 11, in which each said branch element is centrally bent into general "U" shape, each said branch element being secured at a different frame opening with both longitudinal ends extending upwardly and outwardly.

14. An artificial-plant structure, comprising an upstanding framework of open-mesh orthogonally related spaced wires having a desired surface contour, and a plurality of like foliage-bearing branch elements secured to said framework on one side of said surface contour, each branch element comprising plural foliage bristles bound by and radiating from an elongated wire core and bent substantially in half so that free ends of two arms extend in substantially the same direction and in laterally spaced relation, and means separately fastening each arm to a different upwardly extending wire of said framework, the point of fastening of each arm being substantially removed from the free end thereof.

15. The structure of claim 14, in which said free ends are bent with outward inclination away from said surface contour.

16. The structure of claim 14, in which, to the extent that said branch-element arms extend upwardly and near the wires to which they are fastened, they and their foliage substantially mask said wires, and in which the foliage in the vicinity of the bend of each said branch element is positioned in substantial overlap with a part of said framework connecting the wires to which said arms are fastened.

17. The simulated plant of claim 4, in which each branch element comprises plural foliage bristles bound by and radiating from an elongated wire core.

References Cited

UNITED STATES PATENTS

| 1,134,834 | 4/1915 | Fisher, Sr. | 240—10 |
| 2,864,192 | 12/1958 | Shoalts | 161—22 X |
| 3,113,400 | 12/1963 | Emond | 211—181 X |
| 2,725,205 | 11/1955 | Wagler | 248—27.8 |
| 3,064,379 | 11/1962 | Hertzberg | 161—24 |
| 3,170,587 | 2/1965 | Beeber | 161—31 X |

PHILIP DIER, Primary Examiner

U.S. Cl. X.R.

211—181; 248—27.8